(12) United States Patent
Mather et al.

(10) Patent No.: US 9,642,236 B2
(45) Date of Patent: May 2, 2017

(54) THREAD CONNECTION FOR A TORCH SYSTEM

(71) Applicant: Hypetherm, Inc., Hanover, NH (US)

(72) Inventors: Jonathan P. Mather, Grafton, NH (US); Jeffrey R. Cornish, Newport, NH (US); Geoffrey W. Smith, New London, NH (US); Boris Mandadzhiev, Melrose, MA (US); Harshawardhan Jogdand, Lebanon, NH (US); Shawn Laflamme, North Concord, VT (US); George Caccavaro, Croydon, NH (US)

(73) Assignee: Hypertherm, Inc., Hanover, NH (US)

( * ) Notice: Subject to any disclaimer, the term of this patent is extended or adjusted under 35 U.S.C. 154(b) by 870 days.

(21) Appl. No.: 14/031,420

(22) Filed: Sep. 19, 2013

(65) Prior Publication Data
US 2015/0076819 A1    Mar. 19, 2015

(51) Int. Cl.
  *H05H 1/34* (2006.01)
  *B23K 9/32* (2006.01)
  *B23K 10/00* (2006.01)

(52) U.S. Cl.
  CPC .............. *H05H 1/34* (2013.01); *B23K 9/32* (2013.01); *B23K 10/00* (2013.01)

(58) Field of Classification Search
  CPC . H05H 1/34; B23K 9/32; F16L 15/001; F16L 15/006
  USPC .............. 285/390, 391; 219/121.52, 121.39, 219/121.48, 75; 313/231.41, 231.51; 315/111.21
  See application file for complete search history.

(56) References Cited

U.S. PATENT DOCUMENTS

| | | | | |
|---|---|---|---|---|
| 906,217 | A | * 12/1908 | Gaylord | F16L 37/2445 285/376 |
| 1,325,468 | A | * 12/1919 | Foster | F16L 37/252 285/308 |
| 4,695,702 | A | 9/1987 | Gartland | |
| 5,399,831 | A | * 3/1995 | McGee | H05H 1/3405 219/121.48 X |
| 5,874,707 | A | 2/1999 | Iida et al. | |
| 6,169,264 | B1 | 1/2001 | Marhic | |
| 6,283,511 | B1 | * 9/2001 | Kamp | E21B 17/0426 285/334.4 |
| 6,881,921 | B2 | 4/2005 | Horner-Richardson et al. | |

(Continued)

FOREIGN PATENT DOCUMENTS

| EP | 0757408 B1 | 5/1997 |
|---|---|---|
| EP | 1 988 324 A2 | 11/2008 |

(Continued)

*Primary Examiner* — Gregory Binda
*Assistant Examiner* — Zachary Dragicevich
(74) *Attorney, Agent, or Firm* — Proskauer Rose LLP

(57) ABSTRACT

A connector component is provided for assembly into a torch. The connector component comprises a body that includes a proximal end and a distal end disposed along a longitudinal axis. At least two thread regions are disposed radially about the longitudinal axis on a surface of the body near the proximal end. Each thread region includes at least two parallel threads disposed on the surface of the body. In addition, at least two smooth regions are each disposed radially about the longitudinal axis between a pair of thread regions on the surface of the body.

25 Claims, 6 Drawing Sheets

(56) References Cited

U.S. PATENT DOCUMENTS

| | | | |
|---|---|---|---|
| 6,957,972 B2 * | 10/2005 | Starke | H01R 13/625 439/216 |
| 6,987,237 B2 | 1/2006 | Walters | |
| 6,987,238 B2 | 1/2006 | Horner-Richardson et al. | |
| 7,429,714 B2 * | 9/2008 | DePetrillo | H05H 1/30 219/121.48 |
| 2005/0218132 A1 * | 10/2005 | Wells | B23K 9/32 219/137.61 |
| 2008/0185842 A1 | 8/2008 | Blackman et al. | |
| 2009/0123226 A1 * | 5/2009 | Viegener | F16L 15/001 403/268 |
| 2009/0170364 A1 | 7/2009 | Scholler et al. | |
| 2011/0259855 A1 * | 10/2011 | Yang | H05H 1/28 219/121.52 X |
| 2012/0272508 A1 | 11/2012 | Stauss | |

FOREIGN PATENT DOCUMENTS

| | | |
|---|---|---|
| JP | 57-44467 | 3/1982 |
| WO | 03041459 A2 | 5/2003 |
| WO | 2013028487 A1 | 2/2013 |

* cited by examiner

THREAD CONNECTION FOR A TORCH SYSTEM

FIELD OF THE INVENTION

The present invention relates generally to one or more connector components configured for connecting torch parts to a torch system.

BACKGROUND OF THE INVENTION

Torches, such as plasma arc torches and water jet torches, are widely used in the heating, cutting, gouging and marking of materials. A plasma arc torch generally includes electrical connections, passages for cooling, passages for arc control fluids (e.g., plasma gas), and consumables, such as an electrode and a nozzle having a central exit orifice mounted within a torch body. Optionally, a swirl ring is employed to control fluid flow patterns in the plasma chamber formed between the electrode and the nozzle. In some plasma arc torches, a retaining cap can be used to maintain the nozzle and/or swirl ring in the torch body.

One or more connector components can be used to attach the consumables to a torch system. Existing connector components with standard threading, however, can require as many as five complete rotations to engage or disengage a consumable. Changing consumable parts may be frequent, often occurring several times a day. Hence, existing connector components can slow down the consumable changing process, thereby reducing the time that can be spent on cutting and other useful torch operations.

SUMMARY OF THE INVENTION

Thus, systems and methods are needed to simplify the engagement and disengagement of a torch part in relation to a torch system, such as reducing the number and/or degree of rotation required to fully engage or disengage the torch parts. By allowing torch connections to be engaged or disengaged faster and easier, handling time of a torch can be reduced. Conversely, torch operation time can be increased.

In one aspect, a connector component is provided for assembly into a torch. The connector component comprises a body that includes a proximal end and a distal end disposed along a longitudinal axis. At least two thread regions are disposed radially about the longitudinal axis on a surface of the body near the proximal end. Each thread region includes at least two parallel threads disposed on the surface of the body. In addition, at least two smooth regions are each disposed radially about the longitudinal axis interspersed between a pair of thread regions on the surface of the body.

In some embodiments, the connector component comprises a male component configured to securely engage a female component. The male component can include a gap disposed at the distal end of the body. The gap is configured to prevent rotation of the male component in the female component unless the gap is aligned with a corresponding rim of the female component.

In some embodiments, the connector component comprises a female component configured to securely engage a male component. The female component can include a rim disposed on the distal end of the body. The rim is configured to prevent rotation of the male component in the female component unless the rim is aligned with a corresponding gap of the male component.

In some embodiments, the at least two thread regions are disposed radially about the body in a rotationally symmetrical arrangement. In some embodiments, the at least two smooth regions are disposed radially about the body in a rotationally symmetrical arrangement. In some embodiments, the at least two parallel threads are oriented substantially helical about the longitudinal axis. In some embodiments, the at least two parallel threads are oriented substantially orthogonal to the longitudinal axis. The at least two parallel threads can be evenly spaced relative to each other along the longitudinal axis.

In some embodiments, the connector component includes three thread regions.

In some embodiments, the threads of one thread region are discontinuous from the threads of an adjacent thread region. The location and orientation of the threads on one thread region can be substantially the same as those of another thread region.

In some embodiments, the connector component is configured to secure a corresponding component. At least one of the smooth regions of the connector component can be configured to align with at least one of the thread regions of the corresponding component to facilitate slidable displacement of one component into the other component. During engagement, one component can be rotatable in relation to the other component in a first direction by a number of degrees less than 360° to secure the other component. For example, the number of degrees can be less than or equal to about 60°, 90°, or 180°. The components can be disengaged when one component is rotated in relation to the other component in a second direction opposite from the first direction by about the same number of degrees.

In some embodiments, the connector component is coupled to a consumable of the plasma arc torch for attaching the consumable to another element of the plasma arc torch. The consumable can comprise one of an electrode, nozzle, retaining cap, shield or torch.

In another aspect, a consumable connector component is provided for attaching a consumable to a corresponding component of a torch. The consumable connector component comprises a cylindrical body that includes a proximal end and a distal end disposed along a longitudinal axis. Multiple longitudinally-oriented smooth regions are disposed radially about a surface of the body about the proximal end. In addition, multiple longitudinally-oriented segments are disposed radially about the body interspersed between the smooth regions. Each segment includes a plurality of threads disposed in parallel to one another along the surface of the body such that the threads of one segment are discontinuous from the threads of an adjacent segment.

In some embodiments, the location and orientation of the threads on one segment are substantially the same as those of a different segment.

In some embodiments, the discontinuous threads prevent the corresponding component from engaging more than one segment of threads during rotation.

In another aspect, a method is provided for engaging a first component and a second component for a torch. The first and second components each has i) a plurality of thread regions each having a plurality of threads and ii) a plurality of slotted regions characterized by the absence of threads. The method includes aligning radially at least one thread region of the first component with at least one slotted region of the second component, sliding the first component into the second component longitudinally in the radially aligned position, and rotating the first component in one direction relative to the second component to engage at least one thread of the thread region of the first component with at least one thread of the thread region of the second component to secure the first and second components relative to one another.

In some embodiments, the method further comprises preventing the first component from rotating with respect to the second component during the sliding, engaging a gap of the first component with a rim of the second component, and rotating the first component relative to the second component in one direction after the engaging.

In some embodiments, rotating the first component relative to the second component comprises rotating the first component by a number of degrees less than 360°. The number of degrees can be a number that is less than or equal to about 60°, 90° or 180°.

In some embodiments, the method further comprises rotating the first component relative to the second component in an opposite direction by about the same number of degrees to disengage the two components. During disengagement, the first component can be prevented from rotating further in the opposite direction when an edge of a thread region of the first component encounters an edge of a thread region of the second component in the rotational path (i.e., when misalignment of the threads occurs).

In some embodiments, at least one of the first component or the second component is coupled to a consumable of the plasma arc torch.

In some embodiments, the method further comprises aligning radially the plurality of thread regions of the first component with the plurality of slotted region of the second component.

In some embodiments, the method further comprises aligning radially the plurality of slotted regions of the first component with the plurality of thread regions of the second component.

It should also be understood that various aspects and embodiments of the invention can be combined in various ways. Based on the teachings of this specification, a person of ordinary skill in the art can readily determine how to combine these various embodiments. For example, in some embodiments, any of the aspects above can include one or more of the above features. One embodiment of the invention can provide all of the above features and advantages.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Figure 1:
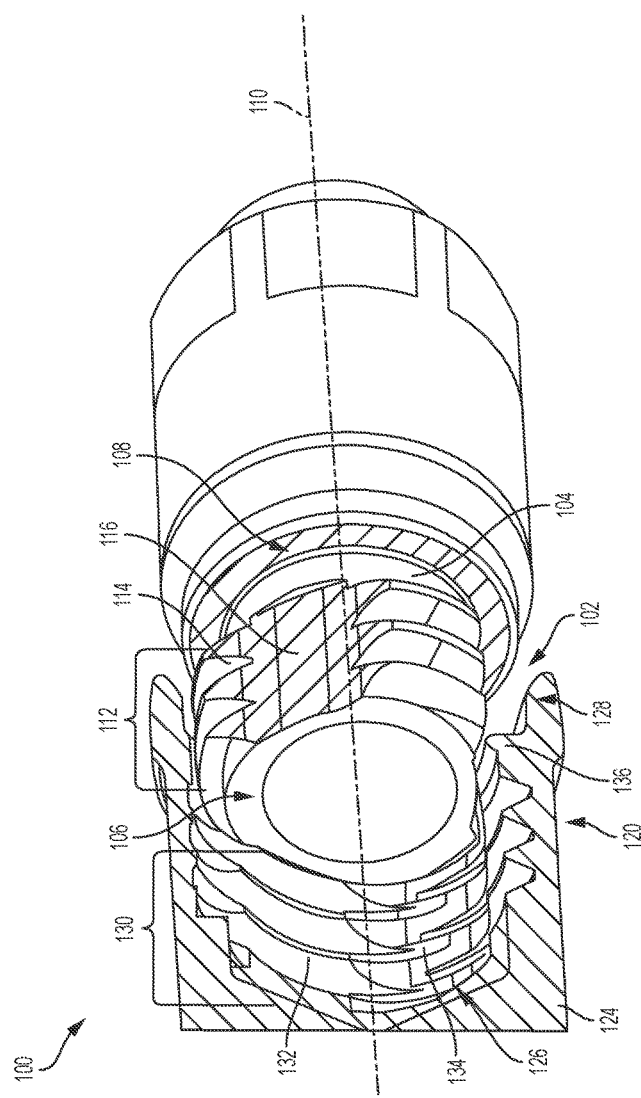
FIG. 1 illustrates an exemplary connector assembly, according to some embodiments of the present invention.

Technologies of the present invention allow torch consumables to be installed and removed faster and easier than standard threaded connections, such as with fewer rotations and/or reduced number of rotational degrees. FIG. 1 illustrates an exemplary connector assembly, according to some embodiments of the present invention. The connector assembly 100 includes a male connector component 102 and a female connector component 120, both of which are configured for assembly into a torch (not shown). In some embodiments, each of the connector components 102, 120 is coupled to a consumable for attachment to one another. Exemplary consumables to which a connector component can be coupled include an electrode, nozzle, retaining cap, shield or torch body. As an example, the female connector component 120 can be integrally constructed on a torch body while the male connector component 102 can be integrally constructed on a nozzle or an electrode for secure engagement with the torch body.

As shown in FIG. 1, the male connector component 102 includes a body 104 having a proximal end 106 and a distal end 108 disposed along a longitudinal axis 110. The proximal end 106 of the male connector component 102 can be characterized as the end that encounters the female connector component 120 first as the male connector component 102 advances into female connector component 120 for engagement. At least two thread regions 112 are disposed radially about the longitudinal axis 110 on an outer surface of the body 104 near the proximal end 106. Each thread region 112 includes at least two parallel threads 114 disposed on the outer surface of the body 104. In some embodiments, the threads 114 are evenly spaced relative to each other and substantially orthogonal to the longitudinal axis 110. In some embodiments, the threads 114 are substantially evenly spaced relative to each other and oriented substantially helically about the longitudinal axis 110. In addition, the male connector component 102 includes at least two smooth regions 116 characterized by the absence of threads or other non-regular features. Each smooth region 116 is disposed radially about the longitudinal axis 110 between a pair of thread regions 112 on the outer surface of the body 104.

Similarly, the female connector component 120 includes a body 124 having a proximal end 126 and a distal end 128 disposed along the longitudinal axis 110. The distal end 128 of the female connector component 120 is characterized as the end that encounters the male connector component 102 first as the female connector component 120 advances towards the male connector component 102 during engagement. At least two thread regions 130 are disposed radially about the longitudinal axis 110 on an inner surface of the body 124 near the proximal end 126. Each thread region 130 can include at least two parallel threads 132 disposed on the inner surface of the body 124. In some embodiments, these threads 132 are evenly spaced relatively to each other and substantially orthogonal to the longitudinal axis 110. In some embodiments, the threads 132 are substantially evenly spaced relative to each other and oriented substantially helically about the longitudinal axis 110. In addition, the female connector component 120 includes at least two smooth regions 134 characterized by the absence of threads or other non-regular features. Each smooth region 134 is disposed radially about the longitudinal axis 110 between a pair of thread regions 130 on the surface of the body 124. In general, the female connector component 120 includes complementary features in comparison to the male connector component 102 to facilitate the secure engagement of the two components.

In some embodiments, each smooth region 116 of the male connector component 102 is appropriately dimensioned such that it functions as a slot for aligning with and receiving a thread region 130 of the female connector component 120. The radial extent of the smooth region 116 can be substantially the same as the radial extent of the thread region 130. Conversely, each smooth region 134 of the female connector component 120 is appropriately dimensioned such that it functions as a slot for aligning with and receiving a thread region 112 of the male connector component 102. The radial extent of the smooth region 134 can be substantially the same as the radial extent of the thread region 112. The smooth regions 116 of the male connector component 102 and the smooth regions 134 of the female connector component 120 can guide the slidable displacement of one component in relation to the other component in the longitudinal direction 110, both during engagement and disengagement.

Figure 2A:
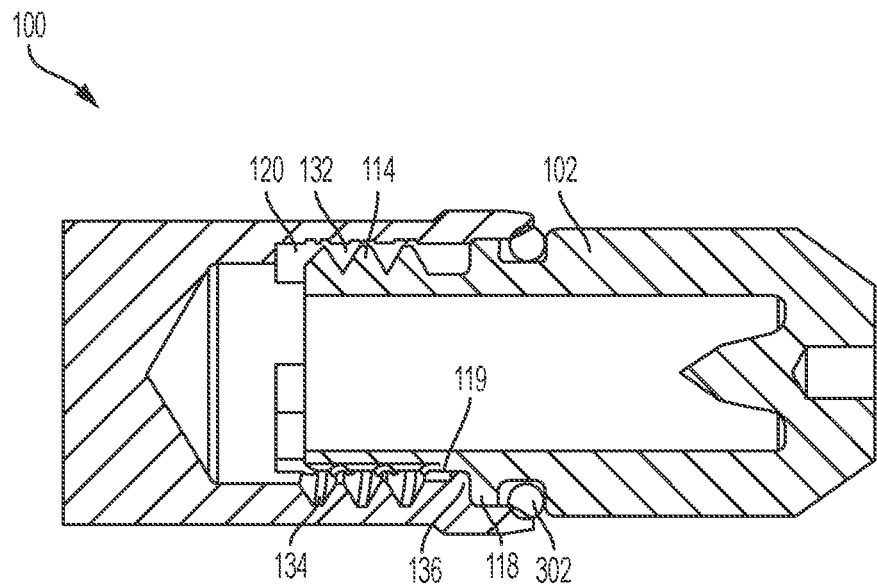
FIGS. 2A and B illustrate various views of the connector assembly of FIG. 1 in the inserted position, according to some embodiments of the present invention.
Figure 2B:
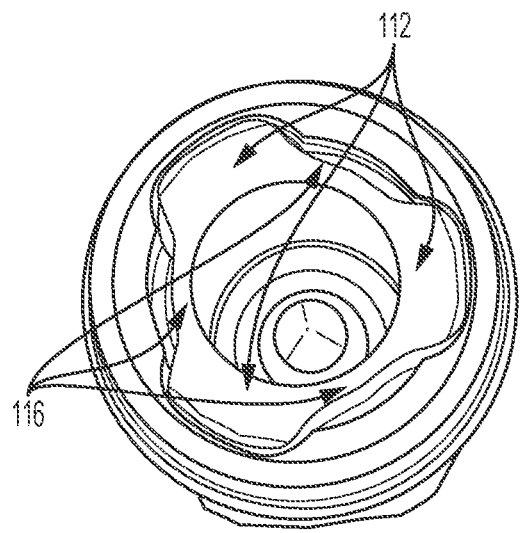

In some embodiments, rotational engagement between the male connector components 102 and the female connector component 120 is only allowed after the male connector component 102 slides to a stopping position within the female connector component 120 in the longitudinal direction 110. This position is hereinafter referred to as the "inserted position," which is prior to the occurrence of rotation. FIGS. 2A and B illustrate various views of the connector assembly of FIG. 1 in the inserted position, according to some embodiments of the present invention. As shown in FIG. 2A, the male component 102 includes a flange 118 disposed at the distal end 108 of the body 104, and the female component 120 includes a stopping rim 136 disposed at the distal end 128 of the body 124. The flange 118 and the stopping rim 136 are configured to interact with each other to prevent further advancement of the male connector component 102 beyond the stopping rim 136 of the female connector component 120 in the longitudinal direction 110. In addition, no rotation of the male connector component 102 within the female connector component 120 can occur during the advancement due to misalignment of the threads 114, 132 on the two components. Rotation is only permitted after the male connector component 102 is fully inserted in the female connector component 120 and the stopping rim 136 of the female connector component 120 locks into position with a rim gap 119 of the male connector component 102, at which point threads 114 on the male connector component 102 are properly positioned relative to the threads 132 on the female connector component 120 to permit threading. In the inserted position, as shown in FIG. 2B, each thread region 112 of the male connector component 102 faces a smooth region (not shown) of the female connector component 120 and each smooth region 116 of the male connector component 102 faces a thread region (not shown) of the female connector component 120.

Figure 3A:
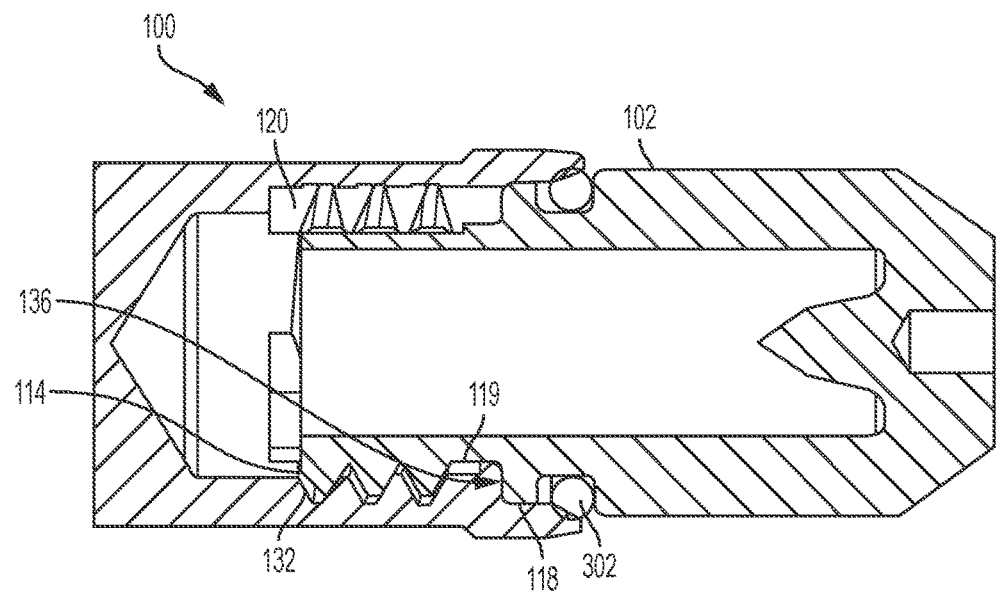
FIGS. 3A and B illustrate various views of the connector assembly of FIG. 1 in the locked position, according to some embodiments of the present invention.
Figure 3B:
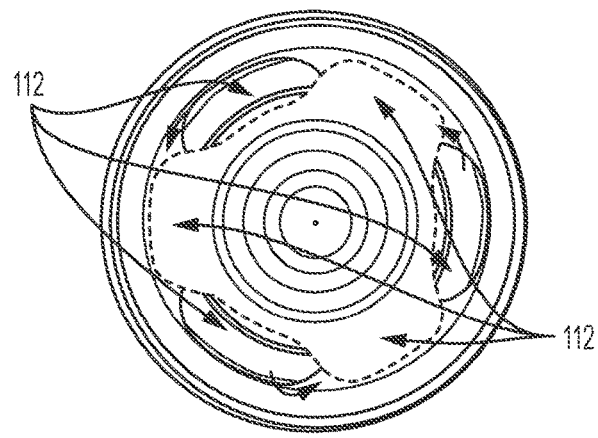

Once the inserted position is reached, one connector component is rotatable in relation to the other connector component in a direction (i.e., clock-wise or counter-clockwise) by a number of degrees less than 360° before the components are securely fastened to each other. This position is hereinafter referred to as the "locked position." In contrast, traditional threaded designs require rotation of at least 360° before being able to securely engage two components. FIGS. 3A and B illustrate various views of the connector assembly of FIG. 1 in the locked position, according to some embodiments of the present invention. To secure the components, the male connector component 102 can be rotated within the female connector component 120 such that the threads 114 of at least one thread region 112 of the male connector component 102 lock into position with the threads 132 of an adjacent thread region 130 of the female connector component 120 in the rotational path, as shown in FIG. 3A. The interlocking between the threads facilitates engagement and prevents further rotation. Thus, during engagement, threads in one, or more, or all of the thread regions of the components can be engaged simultaneously with one rotation of less than 360°. FIG. 3B illustrates that, to reach the locked position, the male connector component 102 is rotated in a counter-clock wise direction by less than or equal to 60 degrees from the inserted position. In other embodiments, engagement between the two components can be achieved by rotation in a clockwise direction. In the locked position, each thread region 112 of the male connector component 102 faces a thread region (not shown) of the female connector component 120 and each smooth region (not shown) of the male connector component 102 faces a smooth region (not shown) of the female connector component 120.

To disengage the two components (i.e., moving from the locked position to the inserted position), an operator can rotate one component in relation to the other component in a direction opposite from the direction of engagement by about the same number of degrees. Thus, during disengagement, threads in one, or more, or all thread regions of the connector components can be disengaged simultaneously with one rotation of less than 360°. When the inserted position is reached upon disengagement, each thread region 112 of the male connector component 102 again faces a smooth region 134 of the female connector component 120 and vise versa. The inserted position facilitates the slideably displacement of the male connector component 102 out of the female connector component 120.

In some embodiments, each thread 132 on the female connector component 120 is wider longitudinally than a standard thread so as to allow the corresponding thread 114 on the male connector component 102 to engage over a wider axial range. In some embodiments, each female thread 132 is a 16-picth thread, which translates to an axial shift along the longitudinal direction 110 of about 0.010 inch when rotated about 60° between the inserted position and the locked position. In some embodiments, the wider width of the female threads 132 is adapted to prevent accidental engagement with the male threads 114 when in the inserted position (i.e., prior to rotation to the locked position). Otherwise, the male threads 114 can extend beyond the entrance of the groove of the adjacent female threads 132 even in the inserted position, thus unintentionally locking the components to each other. In alternative embodiments, however, threads of the two components can be engaged before reaching the locked position.

In some embodiments, the threads of one thread region are discontinuous from the threads of an adjacent thread region for each of the connector components 102, 120. That is, for each connector component, the pitch of each thread does not create a continuous path from one thread region to the next. This is to prevent the threads of one thread region of one component from accidentally engaging the threads of an adjacent thread region of the other component in the rotational path during disengagement. Specifically, during disengagement, when male threads 114 of a thread region 112 is rotated back to the inserted position, the male threads 114 are prevented from further engagement with the female threads 132 of an adjacent thread region 130 in the rotational path because the male threads 114 cannot align with the adjacent female thread 132.

In general, the degree of rotation required for maximum engagement of the female connector component 120 and the male connector component 102 is dependent the number of thread regions and smooth regions disposed on a body of each component. For example, if each component has one smooth region and one thread region, the degree of rotation is 180°. If each component has two smooth regions and two thread regions, the degree of rotation is 90°. If each component has three smooth regions and three thread regions, the degree of rotation is about 60°. FIGS. 1-3 show that the male connector component 102 includes three thread regions 112 interspersed among three smooth regions 116, such that each thread region 112 is between a pair of smooth regions 116. In a complementary fashion, the female connector component 120 includes three thread regions 130 interspersed among three smooth regions 134, such that each thread region 130 is between a pair of smooth regions 134. To minimize the degree of rotation required to join the female and male connector component, an even higher number of smooth regions and/or thread regions per connector component is possible. In addition to the number of thread and/or smooth regions, the amount of rotation is also dependent on the tolerances and locations of the threads.

One possible limitation associated with applying a small number of degrees of rotation (e.g., about 60°) for engagement is that it may be difficult to use the threading motion to convert rotational force into axial force so to overcome resistance (e.g., O-ring friction) generated from insertion over a relatively long longitudinal distance. The severity of the resistance depends on a number of factors, including the type of resistance, the size of the parts and the thread pitch. In some embodiments, a tapered O-ring seal 302 is used to reduce the length of resistance and allow the components to be easily inserted to the required depth.

Figure 4A:
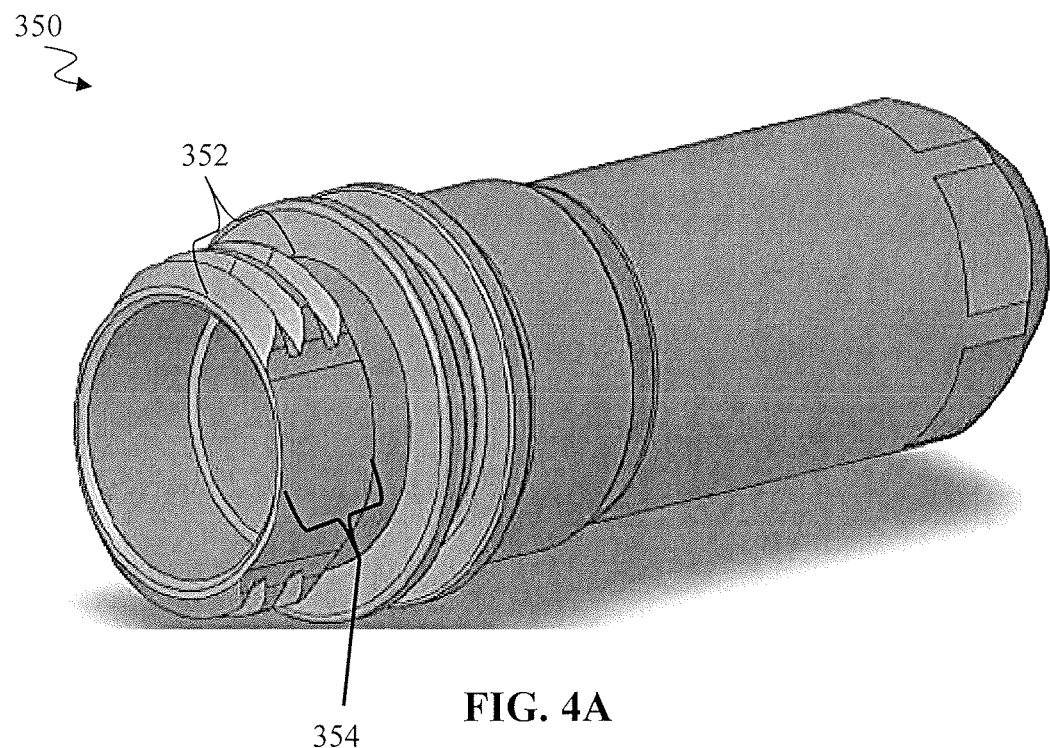
FIGS. 4A and B illustrate another exemplary set of female and male connector components, according to some embodiments of the present invention.
Figure 4B:
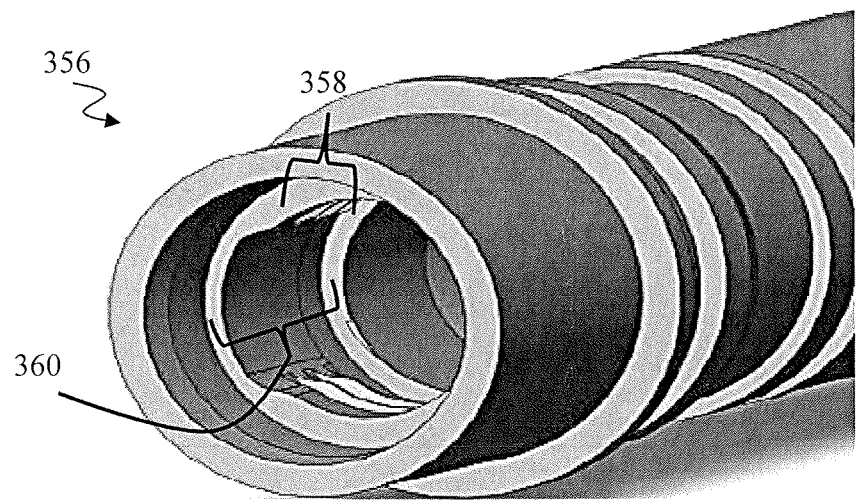

FIGS. 4A and B illustrate another exemplary set of female and male connector components, respectively, according to some embodiments of the present invention. As shown, the male connector component 350 of FIG. 4A includes two thread regions 352 and two smooth regions 354 on an exterior surface of the component. Similarly, the female connector component 356 of FIG. 4B include two thread regions 358 and two smooth regions 360 on an interior surface of the component. The male and female connector components 350, 356 function similarly to the corresponding components of the connector assembly 100 described above with reference to FIGS. 1-3, except a rotation of less than or equal to about 90° can be applied to achieve engagement and disengagement between the connector components, 350, 356. This is due to the presence of two thread regions/smooth regions on each connector component in comparison to three thread regions/smooth regions associated with the connector assembly 100.

The connector assembly of FIG. 1 or 4 can be constructed by modifying a standard thread profile or using a custom profile. To customize the design of each connector component, one or more identical thread regions can be fabricated on a smooth component body in various rotational positions, such as in three different rotational positions if three thread regions per component is desired. In some embodiments, during the machining process of each component, the threads in each thread region is properly spaced from the stop structure (i.e., a stop rim 136 for the female connector component 120 or a flange 118 for the male connector component 102 of connector assembly 100) to ensure interchangeability over the life of the components.

In some embodiments, to ensure interchangeability of the components and rotational symmetry during the engagement/disengagement process, the thread regions of each connector component are configured to be rotationally symmetrical about the body of the connector component. Similarly, the smooth regions are also radially disposed about the body in a rotationally symmetrical manner. In addition, the location and orientation of the threads on one thread region of a component can be substantially the same as those of another thread region of the same component or that of a mating component. This means that the threads are fabricated in identical sections as oppose to continuous threads. In some embodiments, thread milling is used to produce the thread sections on both the female connector component 120 and the male connector component 102. The radially-symmetrical geometry of the connector components suggest that the male connector component 102 can be inserted into the female connector component 120 for engagement in multiple rotational positions, depending on the number of thread regions/smooth regions present.

Figure 5:
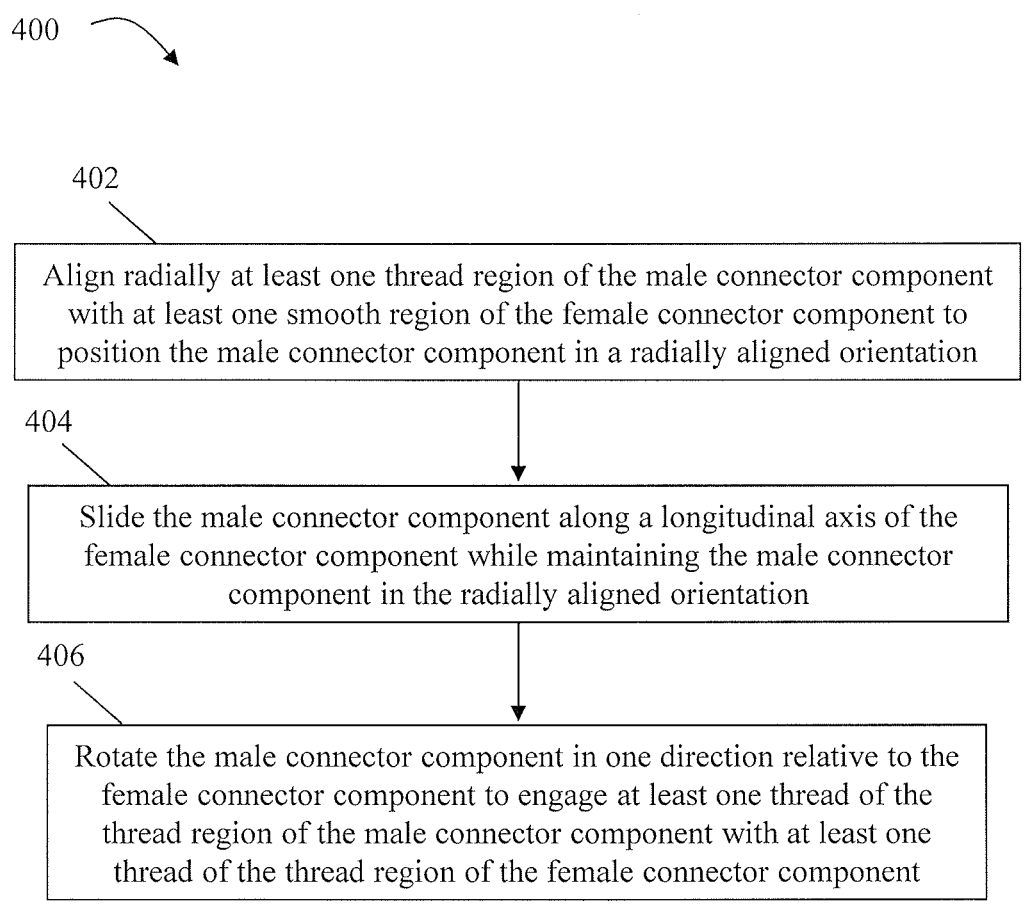
FIG. 5 illustrates a method for securing a male connector component to a female connector component, according to some embodiments of the present invention.

FIG. 5 illustrates a method 400 for securing a male connector component to a female connector component, such as the male connector component 102 to the female connector component 120 of FIG. 1, according to some embodiments of the present invention. At step 402, each of the thread regions 112 of the male connector component 102 is radially aligned with a smooth region 134 of the female connector component 120. Conversely, each of the smooth regions 116 of the male connector component 102 can be radially aligned with a thread region 130 of the female connector component 120. In some embodiments, the thread regions of both the female connector component 120 and the male connector component 102 are about identical. That is, the location and orientation of the threads on one thread region are substantially the same as those of a different thread region associated with the same or different components. In addition, the thread regions and smooth regions can be rotationally symmetrical about each of the components. In view of such geometry, the radial alignment between the components at step 402 can be achieved in several rotational positions, relatively independent of the angle of insertion of the male connector component 102 into the female connector component 120.

At step 404, the male connector component 102 is inserted along the longitudinal direction 110 into the female connector component 120 while being maintained in the radially aligned orientation. The insertion can be accomplished without any rotation. In some embodiments, the sliding stops when the flange 118 of the male connector component 102 encounters the stop rim 136 of the female connector component 120 (i.e., the inserted position). In some embodiments, the two components are prevented from rotating relative to each other until the inserted position is reached and the stopping rim 136 locks into position with the rim gap 119, at which point the threads of the two components are aligned to permit rotation.

At the inserted position of step 406, the male connector component 102 is rotated in one direction relative to the female connector component 120 to lock the threads 114 of at least one thread region 112 of the male connector component 102 with the threads 132 of an adjacent thread region 130 of the female connector component 120 in the rotational path, thereby securing the components to one another. The amount of rotation required to achieve maximum engagement at the locked position can be less than 360°, such as less than or equal to about 60°, 90° or 180°.

To disengage the components, the male connector component 102 can be rotated relative to the female connector component 120 in an opposite direction by about the same number of degrees as the rotation used during the engagement process. While disengaging, the male connector component 102 is prevented from rotating further in the opposite direction in the female connector component 120 when an edge of a thread region 112 of the male component 102 encounters an edge of a thread region 130 of the female component 120 in the rotational path.

Even though the method of FIG. 5 is described with the male connector component 102 being rotatable relative to the female connector component 120 during both the engagement and disengagement processes, the female connector component 120 can also be rotated with respect to the male connector component 102 to achieve the same effects.

Figure 6:
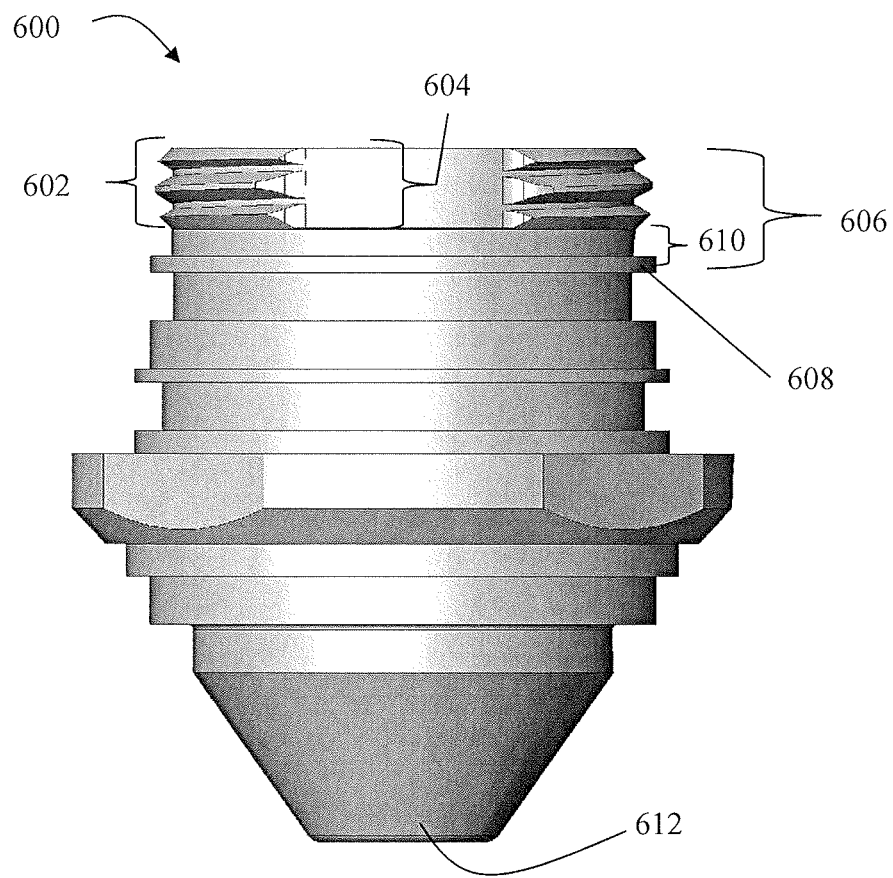
FIG. 6 illustrates an exemplary connector component associated with a nozzle, according to some embodiments of the present invention.

FIG. 6 illustrates an exemplary nozzle having a connector component disposed thereon, according to some embodiments of the present invention. As shown, the nozzle 600 includes a male connector component 606 disposed at the distal end of the nozzle 600 away from the nozzle tip 612. The male connector component 606 is configured to engage with a female connector component (not shown). The male connector component 606 can be integrally constructed from the body of the nozzle 600 or comprise a separate structure coupled to the nozzle 600. The male connector component 606 has two thread regions 602 and two smooth regions 604. The male connector component 606 also includes a flange 608 for interacting with a stopping rim (not shown) of a female connector component to prevent the male connector component 606 from further advancing inside of the female connector component when in the inserted position. The male connector component 606 additionally includes a rim gap 610 for interlocking with a stopping rim of the female connector component to permit rotation of the male connector component 606 inside of the female connector component when the inserted position is reached. Rotation from the inserted position to the locked position is also facilitated by the alignment of the thread regions 602 of the male connector component 606 with corresponding adjacent thread regions (not shown) of the female connector component in the rotational path.

In general, the present invention allows a torch part with a connector component coupled thereto to be positioned in, or close to, its final axial position without rotating either the connector component or the corresponding component. Once in the inserted position, each of the torch parts can be rotated to a number of degrees less than 360° to securely engage the parts with a sufficient joint strength and/or current-carrying capacity same as a traditional joint (e.g., a full-threaded joint).

It should also be understood that various aspects and embodiments of the invention can be combined in various ways. Based on the teachings of this specification, a person of ordinary skill in the art can readily determine how to combine these various embodiments.

What is claimed is:

1. A connector component configured for coupling an electrode to a plasma arc torch, the connected component adapted to secure to a corresponding component of another element of the plasma arc torch to attach the electrode to the other element, the connector component comprising:
   a body including a proximal end and a distal end disposed along a longitudinal axis;
   at least two thread regions disposed radially about the longitudinal axis on a surface of the body near the proximal end, wherein each thread region includes at least one thread disposed on the surface of the body; and
   at least two smooth regions each disposed radially about the longitudinal axis between a pair of thread regions on the surface of the body,
   wherein the at least one thread in a first thread region of the at least two thread regions does not create a continuous rotational thread path with the at least one thread of an adjacent thread region of the at least two thread regions, and
   wherein at least one of the smooth regions of the connector component is configured to align with at least one of the thread regions of the corresponding component of the other element to facilitate slidable displacement of the connector component and the corresponding component relative to each other.

2. The connector component of claim 1, wherein the connector component comprises a male component configured to securely engage a female component.

3. The connector component of claim 2, wherein the male component includes a gap disposed at the distal end of the body, the gap being configured to prevent rotation of the male component in the female component unless the gap is aligned with a corresponding rim of the female component.

4. The connector component of claim 1, wherein the connector component comprises a female component configured to securely engage a male component.

5. The connector component of claim 4, wherein the female component includes a rim disposed on the distal end of the body, the rim being configured to prevent rotation of the male component in the female component unless the rim is aligned with a corresponding gap of the male component.

6. The connector component of claim 1, wherein the connector component includes three thread regions.

7. The connector component of claim 1, wherein one component is rotatable in relation to the other component in a first direction by a number of degrees less than 360° to secure the other component.

8. The connector component of claim 7, wherein the number of degrees comprises one of less than or equal to about 60°, less than or equal to about 90°, or less than or equal to about 180°.

9. The connector component of claim 7, wherein the components are disengaged when one component is rotated in relation to the other component in a second direction opposite from the first direction by about the same number of degrees.

10. The connector component of claim 1, wherein the location and orientation of the at least one thread on one thread region is substantially the same as that of another thread region.

11. The connector component of claim 1, wherein the at least two thread regions are disposed radially about the body in a rotationally symmetrical arrangement.

12. The connector component of claim 1, wherein the at least two smooth regions are disposed radially about the body in a rotationally symmetrical arrangement.

13. The connector component of claim 1, wherein the at least one thread of each thread region is oriented substantially orthogonal to the longitudinal axis.

14. The connector component of claim 1, wherein the lack of continuous rotational thread path on the connector component prevents one thread region of the connector component from engaging an adjacent thread region of the corresponding component during disengagement.

15. A consumable connector component of an electrode of a plasma arc torch for attaching the electrode to another element of the torch, the consumable connector component comprising:
a body including a proximal end and a distal end disposed along a longitudinal axis;
at least two thread regions disposed radially about the longitudinal axis on a surface of the body near the proximal end, wherein each thread region includes at least one thread disposed on the surface of the body; and
at least two smooth regions each disposed radially about the longitudinal axis between a pair of the thread regions on the surface of the body,
wherein the at least one thread in a first thread region of the at least two thread regions does not create a continuous rotational path with the at least one thread of an adjacent thread region of the at least two thread regions, and
wherein the consumable connector component is a female component configured to securely engage a male component of the other element.

16. The consumable connector component of claim 15, wherein the location and orientation of the at least one thread on one thread region is substantially the same as that of a different thread region.

17. The consumable connector component of claim 15, wherein the at least one thread in the first thread region is on a different rotational path as the at least one thread on the adjacent thread region, and the threads on the different rotational paths prevent the male component of the other element from engaging more than one thread region during rotation.

18. A method for engaging a first component of an electrode of a plasma arc torch and a second component of the plasma arc torch, the first and second components each having i) a plurality of thread regions each having at least one thread and ii) a plurality of slotted regions characterized by the absence of threads, the method comprising:
aligning radially at least one thread region of the first component with at least one slotted region of the second component;
sliding the first component into the second component longitudinally in the radially aligned position; and
rotating the first component in one direction relative to the second component to engage the at least one thread of the thread region of the first component with the at least one thread of the thread region of the second component to secure the first and second components relative to one another,
wherein at least one thread of a thread region of the second component does not create a continuous rotational thread path with at least one thread of an adjacent thread region of the second component such that the first component is prevented from rotating further in an opposite direction relative to the second component during disengagement when an edge of a thread region of the first component encounters an edge of a thread region of the second component.

19. The method of claim 18, further comprising:
preventing the first component from rotating with respect to the second component during the sliding;
engaging a gap of the first component with a rim of the second component; and
rotating the first component relative to the second component in one direction after the engaging.

20. The method of claim 18, wherein rotating the first component relative to the second component comprises rotating the first component by a number of degrees less than 360°.

21. The method of claim 20, wherein the number of degrees is one of less than or equal to about 60°, less than or equal to about 90° or less than or equal to about 180°.

22. The method of claim 20, further comprising rotating the first component relative to the second component in the opposite direction by about the same number of degrees to disengage the two components.

23. The method of claim 18, wherein at least one of the first component or the second component is coupled to a consumable of the plasma arc torch.

24. The method of claim 18, further comprising aligning radially the plurality of thread regions of the first component with the plurality of slotted region of the second component.

25. The method of claim 18, further comprising aligning radially the plurality of slotted regions of the first component with the plurality of thread regions of the second component.

* * * * *